(12) United States Patent
Marica

(10) Patent No.: US 8,235,195 B2
(45) Date of Patent: Aug. 7, 2012

(54) ENGINE CLUTCH AND METHOD OF USING SAME

(75) Inventor: Adrian Marica, Cypress, TX (US)

(73) Assignee: National Oilwell Varco, L.P., Houston, TX (US)

( * ) Notice: Subject to any disclaimer, the term of this patent is extended or adjusted under 35 U.S.C. 154(b) by 535 days.

(21) Appl. No.: 12/499,318

(22) Filed: Jul. 8, 2009

(65) Prior Publication Data

US 2011/0005884 A1    Jan. 13, 2011

(51) Int. Cl.
*F16D 31/02* (2006.01)
(52) U.S. Cl. .......................... 192/60; 192/21.5
(58) Field of Classification Search ............... 192/60
See application file for complete search history.

(56) References Cited

U.S. PATENT DOCUMENTS

| | | | | |
|---|---|---|---|---|
| 563,989 | A * | 7/1896 | Storey | 192/60 |
| 2,396,352 | A * | 3/1946 | Vickers | 416/43 |
| 3,448,751 | A * | 6/1969 | Rosaen | 137/807 |
| 4,518,069 | A | 5/1985 | Elias | 192/60 |
| 4,932,510 | A | 6/1990 | Takemura et al. | 192/60 |
| 6,186,290 | B1 | 2/2001 | Carlson | 188/164 |
| 6,318,531 | B1 | 11/2001 | Usoro et al. | 192/21.5 |
| 6,412,618 | B1 * | 7/2002 | Stretch et al. | 192/35 |
| 6,932,917 | B2 | 8/2005 | Golden et al. | 252/62.52 |
| 7,243,768 | B2 * | 7/2007 | Gradu | 192/21.5 |
| 7,364,025 | B2 | 4/2008 | Robb et al. | 192/21.5 |

FOREIGN PATENT DOCUMENTS

| | | |
|---|---|---|
| AU | 56927 | 7/1980 |
| EP | 0 365 824 A1 | 5/1990 |
| WO | WO2009/115031 | 9/2009 |

OTHER PUBLICATIONS

Aviation Research, "Magneto/Electro-Rhological Fluids," http://www.rheonetic.com/seismic_mitigation.htm (Jul. 18, 2009).
Benetti et al., "Nonlinear Magnetic Analysis of Multi-plate Magnetorheological Brakes and Clutches," *Proceedings of the COMSOL Users Conference*, pp. 1-5, Milano (2006).
Lord® Rheonetic™ "Rotary Brake MRB-2107-3" Product Bulletin (date unknown).
Percro "Mr Clutch," info@percro.org (Jul. 8, 2009).
PCT/US2010/038266 International Search Report (Oct. 5, 2010).

* cited by examiner

*Primary Examiner* — Richard M. Lorence
(74) *Attorney, Agent, or Firm* — The JL Salazar Law Firm

(57) ABSTRACT

An engine clutch is provided. The clutch includes a drive shaft rotated by the engine, an eccentric shaft selectively rotated by the drive shaft, a clutch fluid, a plurality of pistons, and a fluid regulator. The eccentric shaft is positionable in an opening of the drive shaft for rotation thereby. The eccentric shaft has cylinders extending radially therethrough and a central channel extending longitudinally therethrough. The clutch fluid flows between the cylinders and channel. Each piston is slidably positionable in a cylinder in response to flow of clutch fluid. The pistons have an outer end in constant contact with the drive shaft via a bearing. The fluid regulator is positionable in the central channel for selectively restricting flow of clutch fluid whereby rotational speed of the eccentric shaft is adjusted. The eccentric shaft is connectable to a device, such as a fan, for rotation therewith.

38 Claims, 8 Drawing Sheets

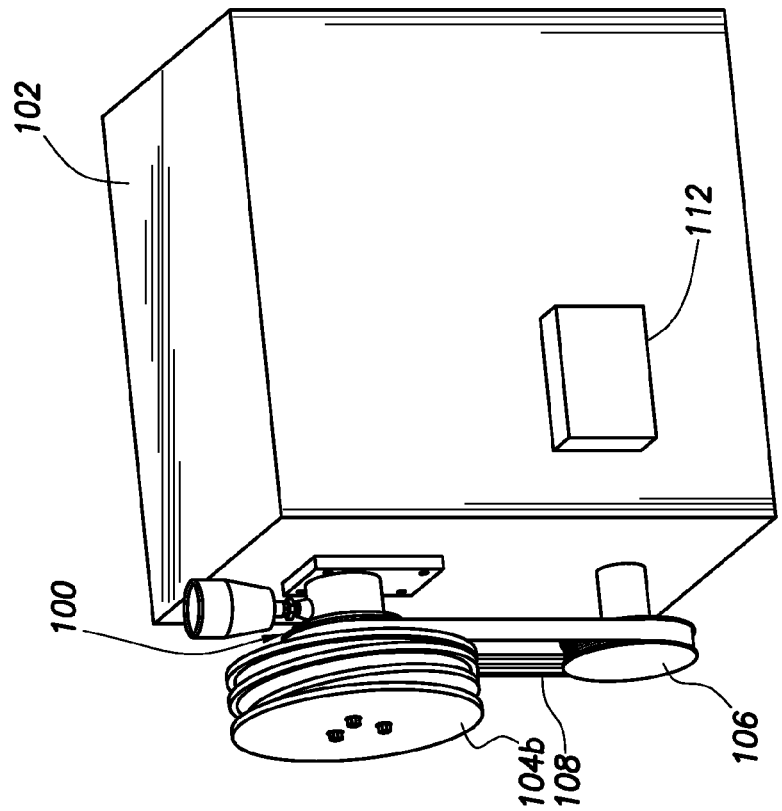
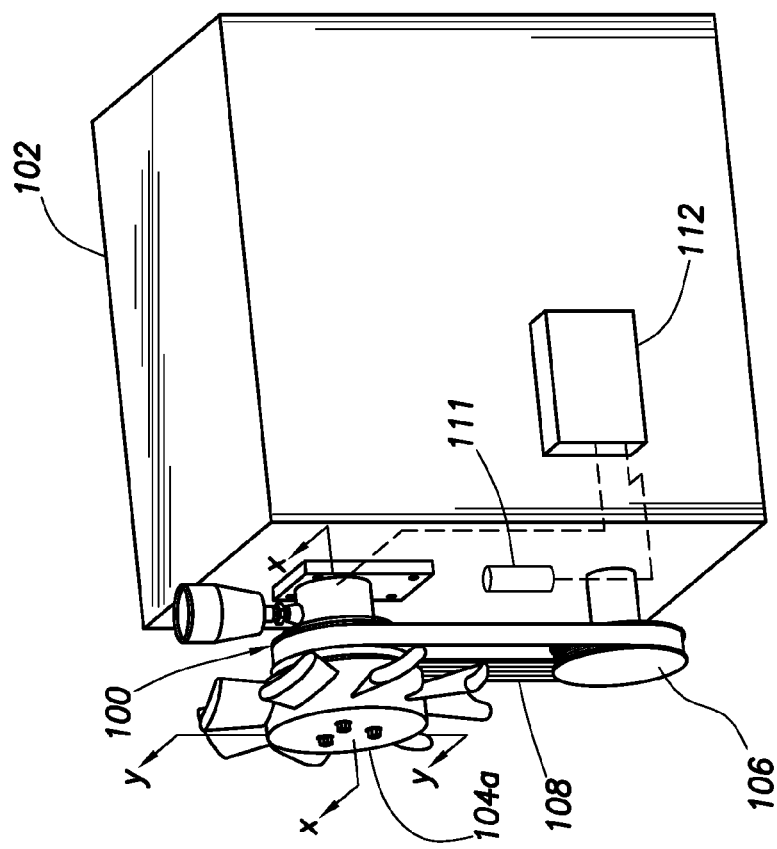
FIG. 1A
FIG. 1B

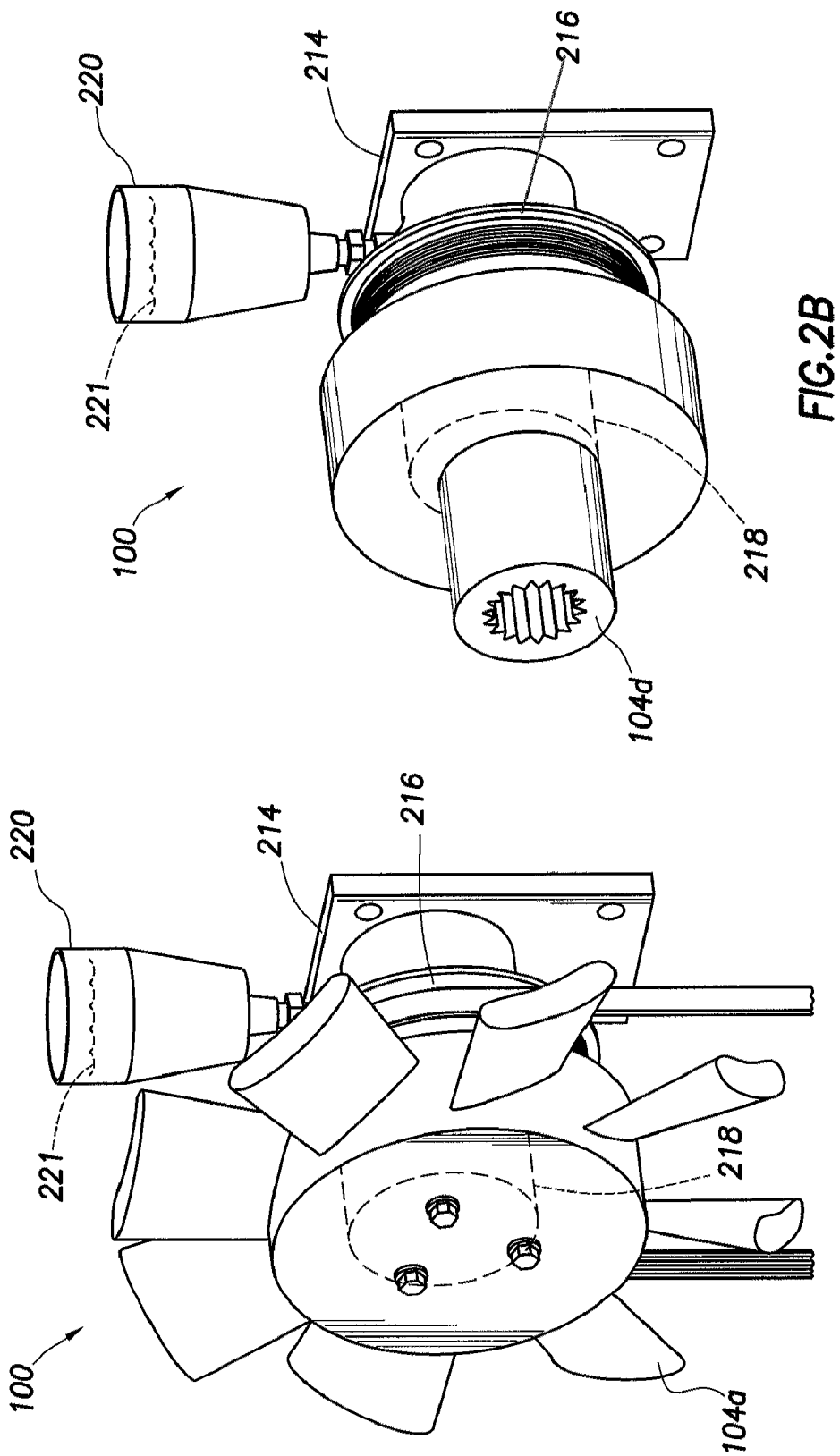

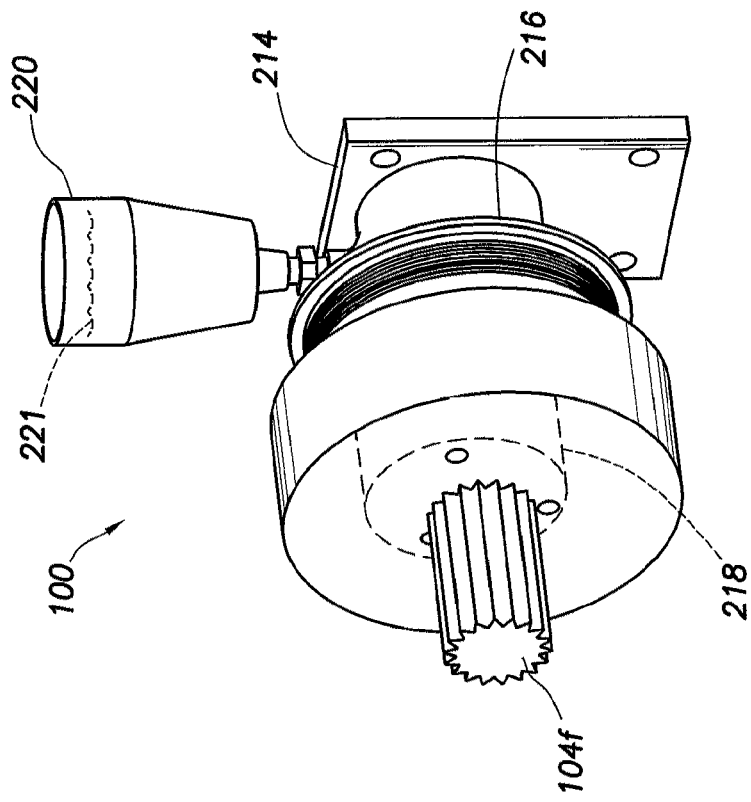
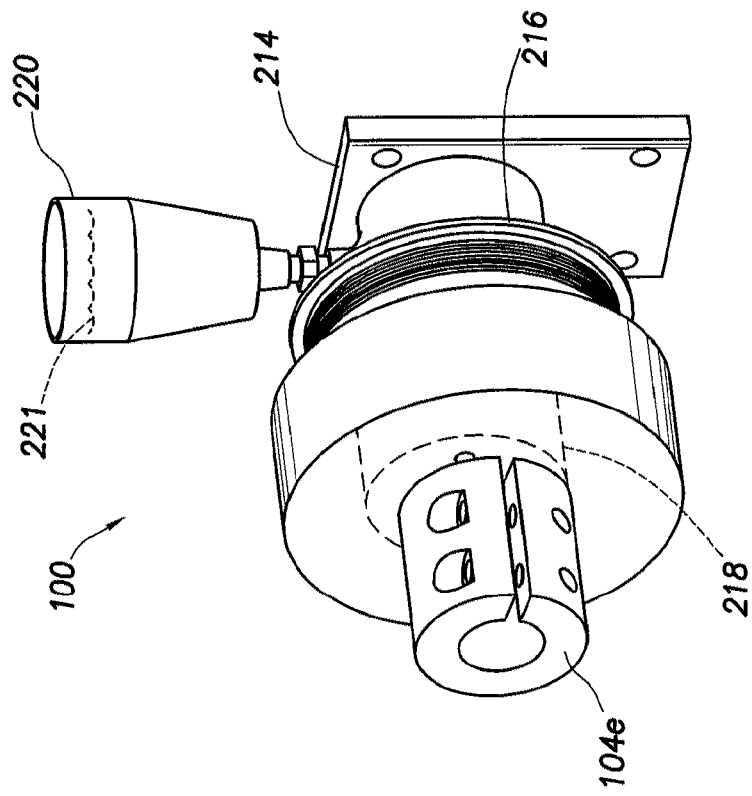

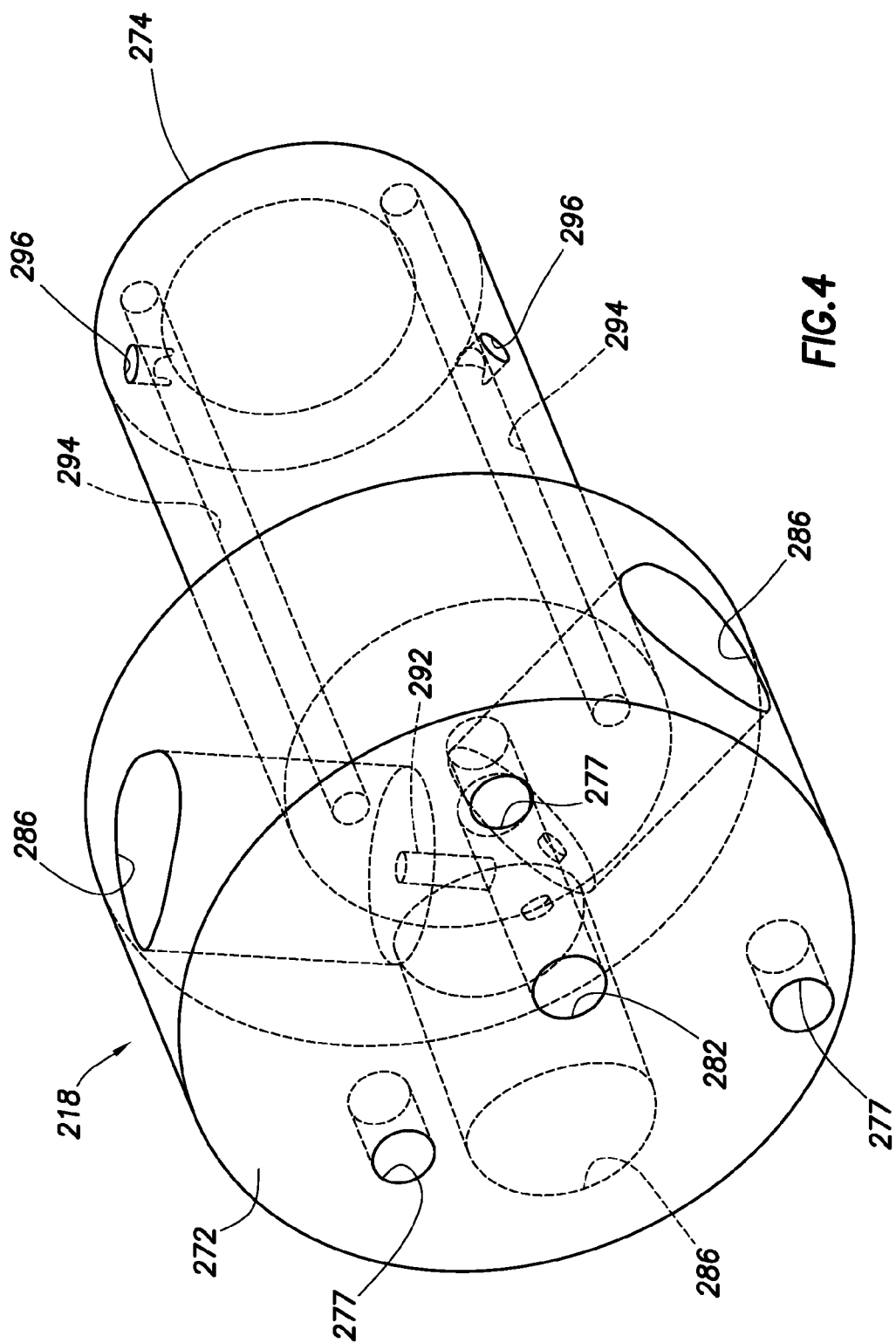

ENGINE CLUTCH AND METHOD OF USING SAME

BACKGROUND OF THE INVENTION

1. Field of the Invention

The present invention relates to engine clutches. In particular, the present invention relates to clutches driven by engines and used to operate devices, such as fans.

2. Background of the Related Art

Over time, engines have been developed to convert energy into a useable output for performing work. Such energy conversion may involve, for example, the conversion of fuel, electricity or other sources into kinetic energy to impart motion. The conversion process used to generate outputs typically creates heat that can result in detrimental effects, such as increased inefficiency, engine damage and/or other negative effects.

To address the detrimental effects associated with heat, engines have been provided with ventilation devices, such as radiators, fans, heat exchangers and/or other devices that are capable of removing heat and/or reducing the temperatures associated with the engine. Fluids, such as air, water, coolants and/or other sources, have been used with ventilation devices to remove heat. However, such ventilation devices typically draw power from the engine (directly or indirectly), thereby further reducing the efficiency of the engine.

Engines have also been provided with mechanisms for transmitting rotation between the engine and another device for performing various functions. For example, clutches have been used to transmit the rotation of a crank shaft of the engine to operate devices, such as transmission, brake and/or other devices. Some engine mechanisms have been used in connection with magneto-rheological ("MR") fluids for performing various functions as described, for example, in U.S. Pat. No. 6,186,290. In particular, MR fluids have been used in connection with clutches as described in U.S. Pat. No. 6,318,531 and M. Benetti, E. Dragoni, and Reggio Emilia, *Nonlinear Magnetic Analysis of Multi-plate Magnetorheological Brakes and Clutches, Excerpt from the Proceedings of the COMSOL Users Conference,* p. 1-5 (2006) Milano. MR fluids have also been used in connection with engine fans as described, for example, in U.S. Pat. Nos. 7,364,025 and 6,932,917.

Despite the existing advancements in engine technology, there remains a need to provide engine clutches that reduce the power drain on the engine. It is desirable that such clutches be adjustable to meet to the needs of a desired operation. It is further desirable that such clutches and/or associated devices be compact and/or simplified. The present invention as described herein has been developed to address these needs.

SUMMARY OF THE INVENTION

In at least one aspect, the present invention relates to a clutch for an engine. The clutch is provided with a drive shaft operatively connectable to the engine for rotation thereby, an eccentric shaft positionable in an opening of the drive shaft and rotatable thereby, a clutch fluid, a plurality of pistons, and a fluid regulator. The eccentric shaft has a plurality of cylinders extending radially therethrough and a central channel extending longitudinally therethrough. The plurality of cylinders and the central channel have fluid communication therebetween. The eccentric shaft is connectable to a device for rotation therewith. The clutch fluid selectively flows between the plurality of cylinders and the central channel. Each of the plurality of pistons is positionable in one of the plurality of cylinders and is slidably movable therein in response to the flow of the clutch fluid. The plurality of pistons has an outer end in constant contact with the drive shaft via a bearing. The fluid regulator is positionable in the central channel for selectively restricting flow of at least a portion of the clutch fluid flowing between the plurality of cylinders and the central channel to selectively permit reciprocation of the plurality of pistons whereby a rotational speed of the eccentric shaft is adjusted.

In another aspect, the invention relates to a clutch system for an engine. The clutch system comprises a clutch and a device operatively connectable to the clutch for rotation therewith. The clutch is provided with a drive shaft operatively connectable to the engine for rotation thereby, an eccentric shaft positionable in an opening of the drive shaft and rotatable thereby, a clutch fluid, a plurality of pistons, and a fluid regulator. The eccentric shaft has a plurality of cylinders extending radially therethrough and a central channel extending longitudinally therethrough. The plurality of cylinders and central channel have fluid communication therebetween. The clutch fluid selectively flows between the plurality of cylinders and the central channel. Each of the plurality of pistons is positionable in one of the plurality of cylinders and is slidably movable therein in response to the flow of the clutch fluid. The plurality of pistons has an outer end in constant contact with the drive shaft via a bearing. The fluid regulator is positionable in the central channel for selectively restricting flow of at least a portion of the clutch fluid flowing between the plurality of cylinders and the central channel to selectively permit reciprocation of the plurality of pistons whereby a rotational speed of the eccentric shaft is adjusted.

Finally, in another aspect, the invention relates to a method of operating a clutch for an engine. The method involves operatively connecting a clutch to the engine for selective rotation thereby, operatively connecting a device to the clutch for rotation therewith, rotationally driving the clutch via the engine and adjusting a rotational speed of the device by selectively activating a fluid regulator. The clutch is provided with a drive shaft operatively connectable to the engine for rotation thereby, an eccentric shaft positionable in an opening of the drive shaft and rotatable thereby, a clutch fluid, a plurality of pistons, and a fluid regulator. The eccentric shaft has a plurality of cylinders extending radially therethrough and a central channel extending longitudinally therethrough. The plurality of cylinders and the central channel have fluid communication therebetween. The clutch fluid selectively flows between the plurality of cylinders and the central channel. Each of the plurality of pistons is positionable in one of the plurality of cylinders and is slidably movable therein in response to the flow of the clutch fluid. The plurality of pistons has an outer end in constant contact with the drive shaft via a bearing. The fluid regulator is positionable in the central channel for selectively restricting flow of at least a portion of the clutch fluid flowing between the plurality of cylinders and the central channel to selectively permit reciprocation of the plurality of pistons.

Other aspects and advantages of the invention will be apparent from the following description and the appended claims.

BRIEF DESCRIPTION OF THE DRAWINGS

So that the above recited features and advantages of the present invention can be understood in detail, a more particular description of the invention may be had by reference to the embodiments illustrated in the appended drawings. It is to be noted, however, that the appended drawings illustrate only typical embodiments of this invention and are, therefore, not to be considered limiting of its scope, for the invention may admit to other effective embodiments. The Figures are not necessarily to scale and certain features and certain views of the Figures may be shown exaggerated in scale or in schematic in the interest of clarity and conciseness.

FIGS. 1A-1C are schematic views of an engine with a clutch operatively connected thereto for driving a device. FIG. 1A depicts the clutch directly driven by the engine and driving a fan. FIG. 1B depicts the clutch directly driven by the engine and driving a clutch pulley. FIG. 1C depicts the engine clutch indirectly driven by the engine and driving a gear.

FIGS. 2A-2D are isometric views of a clutch depicting an eccentric shaft thereof in hidden line. FIG. 2A depicts the clutch with a fan operatively connected thereto. FIG. 2B depicts the clutch with a female connector operatively connected thereto. FIG. 2C depicts the clutch with a coupler operatively connected thereto. FIG. 2C depicts the clutch with a male connector operatively connected thereto.

FIG. 4 is a detailed isometric view of the eccentric shaft of FIG. 2A.

DETAILED DESCRIPTION OF THE INVENTION

Presently preferred embodiments of the invention are shown in the above-identified Figures and described in detail below.

Figure 1C:
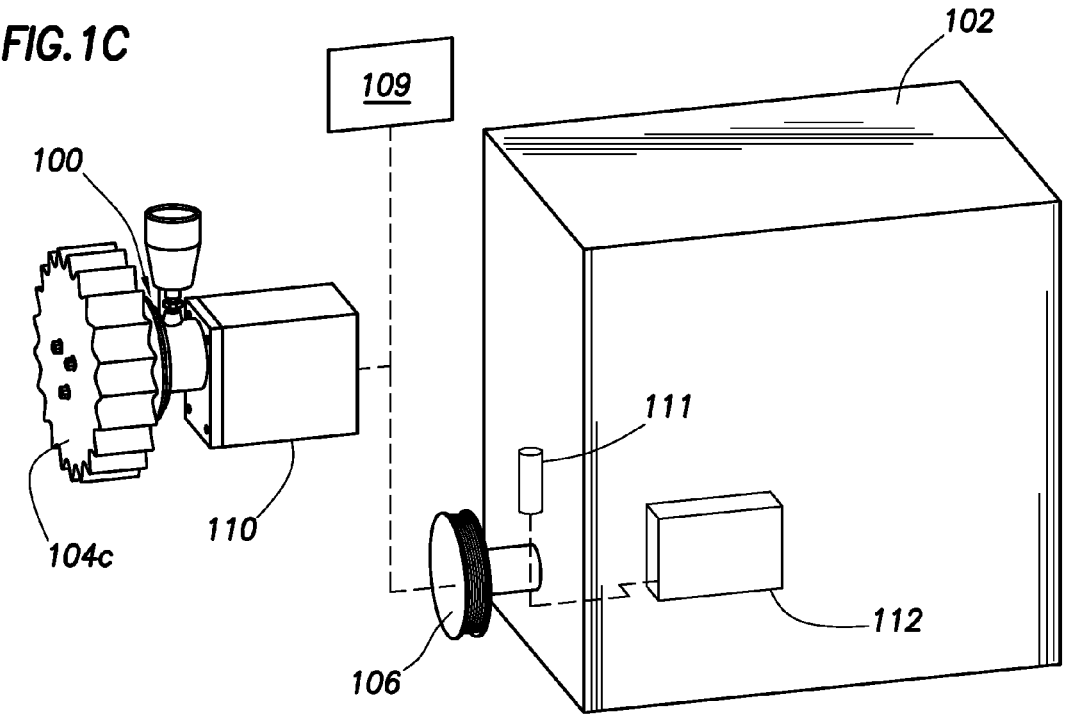

FIG. 1A-1C depict a clutch 100 operatively connected to an engine 102 and driven thereby. The clutch 100 is used to drive a device 104. The device 104 may be any device operatively connectable to the clutch 100 and rotatably drivable thereby, such as a fan 104a as shown in FIG. 1A, a clutch pulley 104b of FIG. 1B or a gear 104c as shown in FIG. 1C. The engine 102 may provide at least some of the power to drive the clutch 100. The clutch 100 of FIGS. 1A and 1B is driven directly by the engine 102. The clutch 100 of FIG. 1C is driven indirectly by the engine 102.

As shown in FIGS. 1A and 1B, the clutch 100 is operatively connected to the engine 102 and rotationally driven thereby via an engine pulley 106. While an engine pulley 106 is shown, any power transmission mechanism may be used to drive the clutch, such as one or more pulleys, gears, or other rotational mechanism. The transmission mechanism may be, for example, mounted on the engine's crankshaft, flywheel or other rotating component driven by the engine 102. As shown, belt 108 is positioned about engine pulley 106 and the clutch 100. The belt 108 transmits rotation from the engine pulley 106 to the clutch 100.

As shown in FIG. 1A, the device 104 is a fan 104a that is directly connected to the engine 102 via clutch 100 to provide ventilation thereof The fan 104a may be rotated by the clutch 100 to increase air flow. The air may flow through an engine's cooling package and/or about the engine 102 itself to remove heat therefrom. For example, the fan 104a may be used for performing various functions, such as heating, cooling and/or otherwise providing flow of gases, such as air, about the engine 102.

As shown in FIG. 1B, the device 104 is a clutch pulley 104b that is directly connected to the engine 102 via clutch 100. The clutch pulley 104b is rotated by the clutch 100 to drive a device (not shown). The device may be directly connected to the clutch pulley 104b. Alternatively, a belt (not shown) may be provided to operatively connect the clutch pulley 104b to the device to be driven thereby. For example, the clutch pulley 104b may operate in a manner similar to the engine pulley 106.

As shown in FIG. 1C, the clutch 100 is operatively connected to the engine 102 and indirectly driven thereby. The engine 102 is operatively connected to a motor 110 via a power source 109, such as a hydraulic pump. The motor 110 drives the clutch 100. The motor 110 may be directly driven by engine pulley 106 or operatively linked thereto via intermediate drivers, such as gears or other devices. The motor 110 may be any motor capable of rotationally driving the clutch 100, such as a hydraulic, pneumatic or electric motor or turbine.

While FIG. 1A-1C depict specific configurations of a clutch 100 and an engine 102, it will be appreciated that variations of these configurations may be provided. For example, the clutch 100 may be powered by the motor 110 and/or the engine 102. The clutch 100 may also be driven separately from or at least partly by the engine 102. In another example, one or more clutches 100 and/or devices 104 may be positioned at various locations about one or more engines 102. The clutch and/or device(s) may be of any size, location and proportion, but the clutch and/or device(s) are preferably incorporated in a small envelope positionable about the engine. The clutch is also preferably configured in conjunction with the engine to optimize engine performance. The engine 102 as used herein may be any engine, motor or other mechanism that is capable of producing an output from a given input, such as a motor vehicle engine or an electric, hydraulic, pneumatic or other motor. The engine 102 may be provided with various components, such as radiators, electric motors, controllers, etc. Such components may work alone or in conjunction with the clutch 100 and/or device(s) indicated generally as 104 and more specifically as 104a through 104f to perform desired functions. As shown in FIGS. 1A and 1C, a sensor 111 may be provided to measure properties, such as temperature or other parameters of the engine 102, clutch 100, devices 104 and/or surrounding environment. The sensor 111 may comprise any suitable sensing/detection device (e.g., thermocouple, thermistor, heat flux sensor, etc.) as known in the art. A controller 112 may also be provided to control the operation of the engine 102 and/or the clutch 100. The controller 112 is depicted as being operatively connected to the sensor 111 and in communication therewith. The sensor may be wirelessly linked via a transceiver, or wired directly to the controller. The controller 112 may activate the clutch, engine, device(s) and/or other components based at least in part on the measured parameters of the sensor 111. The controller 112 may be incorporated in the engine 102 and/or be independent thereof. One or more controllers 112 may be provided for use with the engine 102 and/or clutch 100 to operate as desired. The controller 112 may incorporate or be linked with computer capabilities for performing functions, such as collecting data, analyzing data, making decisions, activating components, etc.

FIGS. 2A-2D show the clutch 100 in greater detail. The clutch 100 includes a mounting bracket 214, a drive shaft 216, and an eccentric shaft 218. A device 104 is connected to the clutch 100. The clutch 100 is also optionally provided with a reservoir 220 for housing a clutch fluid 221.

FIGS. 1A-2D depict various devices that may be used in connection with the clutch 100. The device 104 may be any device that is operatively connectable to the clutch 100 and driven thereby. As shown in FIGS. 1A and 2A, the device 104 may be directly connected to the clutch 100 for performing a function, in this case ventilation. As shown in FIGS. 1B and 1C, the device 104 may be a secondary driver, such as pulley 104*b* and/or gear 104*c* for driving another device. As shown in FIGS. 2B-2D, the device may be a connector, such as female connector 104*d*, coupler 104*e* and/or male connector 104*f*, that links to and drives an additional device. One or more devices 104 may be linked to one or more clutches 100, directly and/or indirectly. The devices 104 may be used to perform any desired function that operates in connection with or independently from engine 102.

Figure 3:
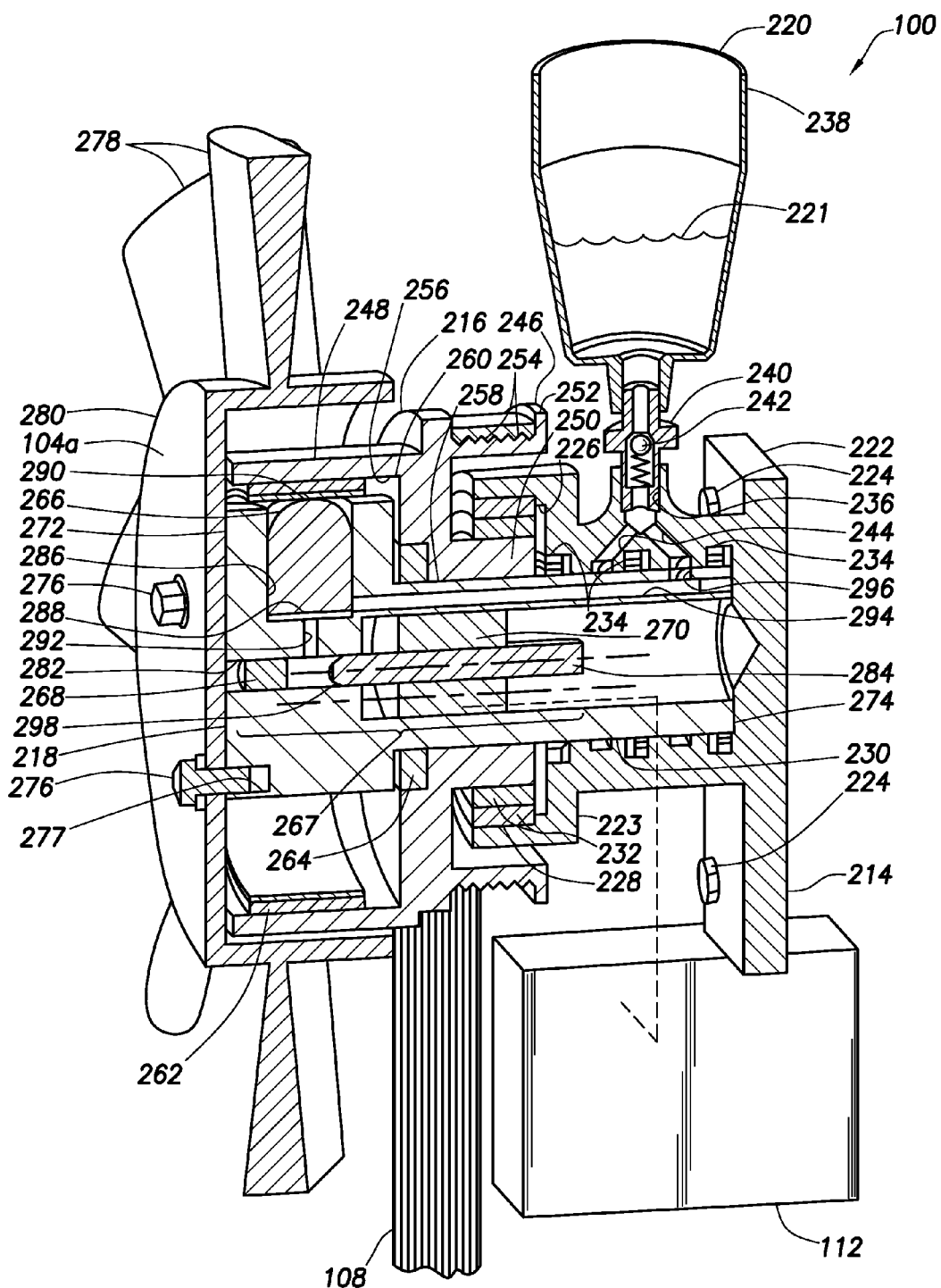
FIG. 3 is a longitudinal cross-sectional view of the clutch and fan of FIG. 1A taken along line x-x.

FIG. 3 shows a longitudinal, cross-sectional view of the clutch 100 with fan 104*a* operatively connected thereto. This view depicts the mounting bracket 214, the drive shaft 216, the eccentric shaft 218 and the fan 104*a* in greater detail. While FIG. 3 shows a fan 104*a* as the operative device, it will be appreciated that one or more devices 104, such as those shown in FIGS. 1A-2D may also be used.

The mounting bracket 214 is mountable to a fixed object, such as engine 102. The drive shaft 216 is operatively connected to the mounting bracket 214 with a driver, such as belt 108 positioned thereabout to impart rotation to the drive shaft 216. While the drive shaft 216 is shown as being connected to a belt 108, the drive shaft 216 may also be configured to connect to other power transmission mechanisms, such as one or more gears or other rotational mechanisms. The eccentric shaft 218 is positioned in the drive shaft 216 and is rotationally driven thereby. The fan 104*a* is operatively connected to the eccentric shaft 218 and is rotationally driven thereby. The speed of the eccentric shaft 218 (and, therefore, fan 104*a*) is adjustable during operation.

The mounting bracket 214 has a mount end 222, and a support end 223 on an opposite end thereof. As shown in FIGS. 1A and 1B, the mount end 222 may be fixedly attached to the engine 102 via mounting bolts 224. As shown in FIG. 1C, the mount end 222 may optionally be fixedly attached to other components about the engine 102. Preferably, the mounting bracket 214 is fixedly attached on or near the engine 102 in a location that supports the clutch 100 and provides optimal performance of the engine 102. The support end 223 of mounting bracket 214 has a support cavity 226 extending therein for receiving the drive shaft 216 and the eccentric shaft 218. The support end 223 supports the drive shaft 216 and the eccentric shaft 218 as they rotate during operation. The support cavity 226 has an inner drive surface 228 corresponding to the drive shaft 216 and an inner clutch surface 230 corresponding to the eccentric shaft 218. Clutch 218 is rotationally positioned in the support cavity 226 adjacent the inner clutch surface 230. Drive shaft 216 is rotationally positioned in the support cavity 226 adjacent the inner drive surface 228 with drive bearings 232 therebetween. Seals 234 are positioned in the support cavity 226 adjacent the eccentric shaft 218 to isolate fluid flow between the eccentric shaft 218 and the mounting bracket 214.

Mounting bracket 214 has a port 236 therein for receiving clutch fluid 221 from reservoir 220. Reservoir 220 has a tank 238 with a nozzle 240 extending into port 236. Preferably, the nozzle 240 is matingly received by the port 236 for passing the clutch fluid 221 therethrough. Clutch fluid 221 in the tank 238 is selectively released into the port 236 via a valve 242, such as a check valve, in the nozzle 240. The clutch fluid 221 flows through port 236 and into conduits 244 extending through the mounting bracket 214.

The drive shaft 216 has a drive end 246 and a clutch end 248. The drive end 246 has an inner ring 250 and an outer ring 252. The inner ring 250 is positioned adjacent the bearings 232 of the mounting bracket 214 and supported thereby. The outer ring 252 is preferably provided with grooves 254 for engaging a rotational driver, such as the belt 108. While outer ring 252 is depicted as being driven by a belt, it will be appreciated that the outer ring may be configured to receive any power transmission mechanism. For example, outer ring 262 may be provided with teeth for engaging a gear. The drive shaft 216 may be driven by the engine 102 via the pulley 106 and belt 108 as shown in FIGS. 1A and 1B. The belt 108 engages the outer ring 252 of the drive shaft 216 to impart rotational movement thereto. The rotation of the drive shaft 216 may be determined by the speed of the engine 100 and a fixed pulley ratio between pulley 106 and drive shaft 216. Alternatively, the drive shaft 216 may be rotationally driven by motor 110 as shown in FIG. 1C. The rotation of the drive shaft 216 of FIG. 1C is determined by the speed of the motor 110.

Referring again to FIG. 3, the clutch end 248 of drive shaft 216 is a cup-shaped member having a clutch cavity 256 extending therethrough for receiving the eccentric shaft 218. The clutch end 248 has a centerline that is offset from the centerline of the drive end 246 and rotates therewith. While shown as offset, in some cases, the clutch end 248 may be concentric with the drive end 246. The clutch cavity 256 has an inner shaft surface 258 at the drive end 246, and an inner clutch surface 260 at the clutch end 248 for receiving the eccentric shaft 218. Needle bearing 262 is positioned in the clutch cavity 256 between the inner clutch surface 260 of the drive shaft 216 and the eccentric shaft 218. A clutch bearing 264 is also provided between drive shaft 216 and eccentric shaft 218 to provide support thereto.

While certain drive, needle and clutch bearings (232, 262, 264) are shown in the clutch 100, it will be appreciated that one or more various bearings may be positioned between various parts of the clutch 100 to provide support and/or to facilitate operation of the clutch 100. Additionally, other items, such as seals 234, may also be positioned about the clutch 100 to restrict the flow of fluid therein.

Eccentric shaft 218 is positioned in the drive shaft 216 and the mounting bracket 214, and supported therein. The eccentric shaft 218 is rotationally driven by the drive shaft 216, but may be selectively adjusted to rotate at a different speed therefrom. Thus, the eccentric shaft 218 (and device 104, such as fan 104*a*) may rotate synchronously with the drive shaft 216, or be adjusted to rotate asynchronously thereto as will be described more fully herein.

The eccentric shaft 218 has pistons 266 and a fluid regulator 267 therein. The eccentric shaft 218 is positioned in the clutch cavity 256 of the drive shaft 216 and the support cavity 226 of the mounting bracket 214. The eccentric shaft 218 has a device end 272 and a shaft end 274. The shaft end 274 extends through the clutch cavity 256 of the drive shaft 216 and into the support cavity 226 of the mounting bracket 214 and is rotationally supported therein.

The device end 272 of eccentric shaft 218 is positioned in the clutch cavity 256 of the drive shaft 216 with the needle bearing 262 therebetween. The device end 272 has a cylindrical shape that correspondingly mates with the cup-shaped clutch end 248 of the drive shaft 216. The device end 272 of the eccentric shaft 218 is positioned in the clutch cavity 256 of the drive shaft 216 for selective rotation therewith.

The fan 104*a* is fixedly attached to the device end 272 of the eccentric shaft 218 via device bolts 276 for rotation therewith. The eccentric shaft 218 is provided with corresponding bolt holes 277 for receiving the device bolts 276. This fixed configuration provides for direct rotation of the fan 104a by the eccentric shaft 218 as the eccentric shaft 218 is rotated by the drive shaft 216. As depicted, the fan 104a has a plurality of fan blades 278 extending radially from a central fan hub 280. The dimensions, angle, position and location of the fan 104a and its components may be selected as desired for the specified application.

Referring now to FIGS. 3 and 4, the eccentric shaft 218 has a central channel 282 extending longitudinally therethrough. The device end 272 of the eccentric shaft 218 has a plurality of cylinders 286 extending radially through the device end 272. Each cylinder 286 has a piston 266 slidably positioned therein. Each piston 266 has a fluid end 288 and a rounded bearing end 290. The bearing end 290 of each piston 266 preferably remains in constant contact with the needle bearing 262. The fluid end 288 of each piston 266 preferably remains in contact with the clutch fluid 221 in the cylinders 286. Radial channels 292 fluidly connect the central channel 282 and the cylinders 286 for fluid communication therebetween. A passageway 294 extends from the cylinder 286 through the shaft end 274 of the eccentric shaft 218 and to an inlet 296 therein. Clutch fluid 221 from reservoir 220 flowing into conduits 244 continues through inlet 296 and into the passageways 294. Seals 234 positioned about inlet 296 isolate fluid flow between the conduits 244 of mounting bracket 214 and the inlet 296 of eccentric shaft 218. The clutch fluid 221 flows through inlet 296, through passageways 294 and into the cylinders 286, radial channels 292 and central channel 282.

The fluid regulator 267 includes a first block 268 and a second block 270 positioned in the central channel 282 for fluidly isolating a portion thereof between blocks 268, 270. The first block 268 is positioned in the central channel 282 near the device end 272. The second block 270 is positioned in a larger portion of the central channel near the shaft end 274. A core 284 of the second block 270 extends into a narrow portion of the central channel 282 at an operative distance from the first block 268. A central chamber 298 for housing the clutch fluid 221 is defined between the portion of the cylinders 286 between each piston 266 and the radial channels 292, in the radial channels 292, and between the fluidly isolated portion of the central channel 282 between the blocks 268, 270. The clutch fluid 221 preferably flows about the central chamber 298 to reciprocate the pistons 266.

The clutch fluid 221 may be selectively restricted by the blocks 268, 270 to adjust the rotational speed of the fan 104a. Preferably, the fluid regulator 267 is positioned in the central channel 282 such that fluid communication between the cylinders 286, the radial channels 292 and/or the central channel 282 is selectively restricted. The selective restriction of the clutch fluid 221 flow into and between the cylinders 286 selectively permits the pistons 266 to reciprocate. The pistons 266 are reciprocated such that the bearing end 290 of each piston 266 remains in contact with the clutch bearing 262 such that the net total volume of all cylinders 286 remains constant. As the pistons 266 reciprocate, the volume in each individual cylinder 286 may vary but the total volume of all cylinders 286 remains constant.

Figure 5A:
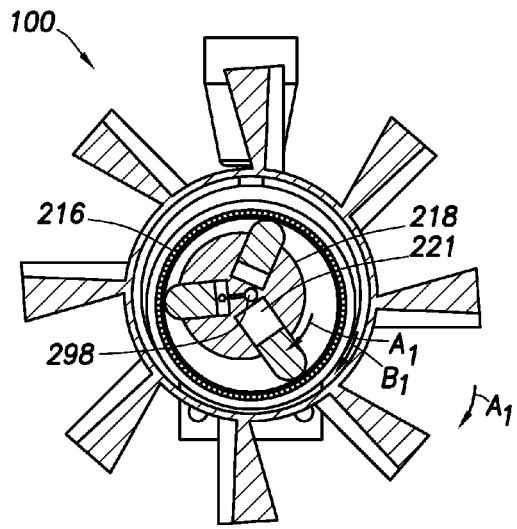
FIGS. 5A-5C are radial cross-sectional views of the clutch and fan of FIG. 1A taken along line y-y and depicting the clutch in the closed position.
Figure 5B:
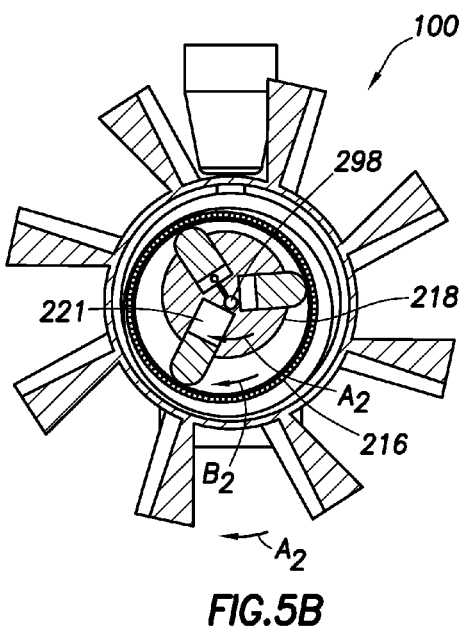
Figure 5C:
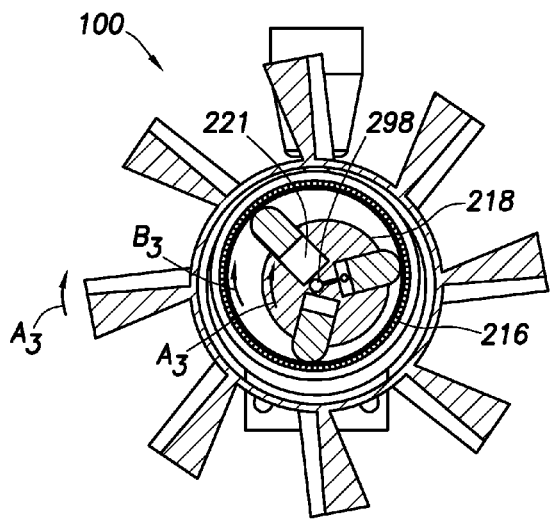
Figure 6A:
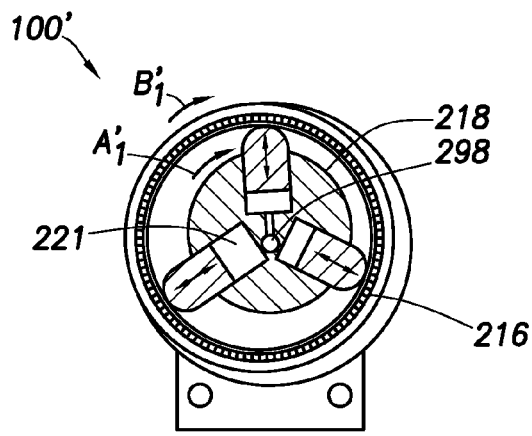
FIGS. 6A-6C are radial cross-sectional views of a modified clutch, depicting the clutch in the open position.
Figure 6B:
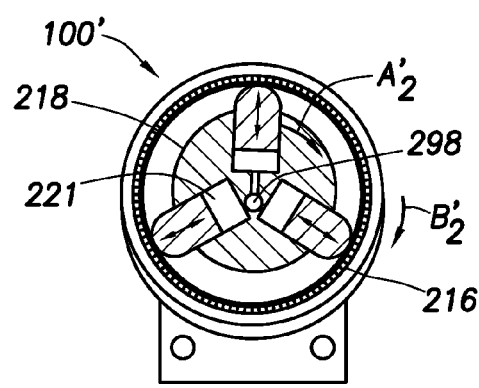
Figure 6C:
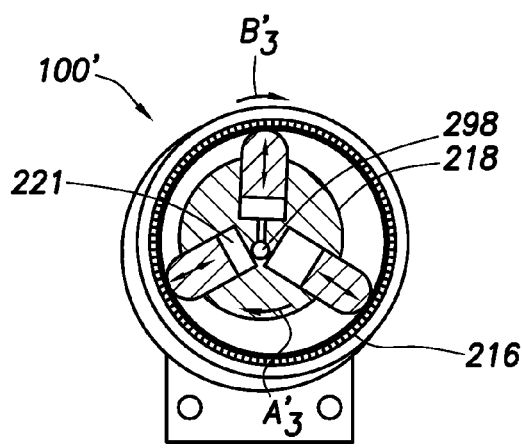

FIGS. 5A-C and 6A-C depict the rotational movement of the eccentric shaft 218 relative to the drive shaft 216 as the clutch fluid 221 flows about the central chamber 298. FIGS. 5A-C show the clutch 100 with the eccentric shaft 218 in the closed position, and the eccentric shaft 218 and drive shaft 216 rotating synchronously. FIGS. 6A-6C depict a modified clutch 100' with the eccentric shaft 218 in the open position, and the eccentric shaft 218 and drive shaft 216 rotating asynchronously.

While only open and closed positions are described, it will be appreciated that a such open and closed positions may be fully and/or partially open and closed positions, respectively. Closed (fully and/or partially) refers to the position of the clutch 100 when the clutch fluid 221 is partially or completely blocked by the fluid regulator 267 from flowing in the central chamber 298 such that the pistons 266 are prevented from reciprocating. Open (fully and/or partially) refers to the position of the clutch 100 when the clutch fluid 221 is partially or completely open to flow in the central chamber 298 such that the pistons 266 are permitted to reciprocate. In this case, the fluid regulator 267 does not block fluid flow in the central chamber 298. Preferably, the flow may be selectively adjusted between the open and closed positions such that the clutch 100 rotates as desired.

FIGS. 5A-C are radial cross-sectional views of the clutch 100 depicting the rotation of the drive shaft 216 relative to the eccentric shaft 218 when in the closed position. FIGS. 5A, 5B and 5C show a given first, second and third position, respectively, of the eccentric shaft 218 and drive shaft 216 as they rotate. Arrows A1, A2 and A3 of FIGS. 5A, 5B and 5C, respectively, show the rotation of the eccentric shaft 218 and the fan 104a at a first, second and third time interval, respectively. Arrows B1, B2 and B3 of FIGS. 5A, 5B and 5C, respectively, show the rotation of the drive shaft 216 at the first, second and third time interval, respectively. As shown, arrows A1, A2 and A3 advance simultaneously with arrows B1, B2 and B3.

Because the eccentric shaft 218 is in the closed position, the fluid regulator 267 prevents the clutch fluid 221 from flowing in the central chamber 298 and reciprocating the pistons 266. In this case, the eccentric shaft 218 and the drive shaft 216 frictionally engage each other and rotate together with little or no slippage therebetween. Thus, the eccentric shaft 218 rotates about synchronously with the drive shaft 216. FIGS. 6A-C are radial cross-sectional views of a modified clutch 100' depicting the rotation of the drive shaft 216 relative to the eccentric shaft 218 when in the open position. The modified clutch 100' as depicted is the same as the clutch 100 of FIGS. 5A-C, except that the fan 104a is not shown, there is no reservoir 220 for providing additional clutch fluid 221, and the eccentric shaft 218 is in the open position. Devices 104, such as those shown in FIGS. 1A-2D may be connected to the clutch 100' and used therewith.

FIGS. 6A, 6B and 6C show a given first, second and third position, respectively, of the eccentric shaft 218 and drive shaft 216 as they rotate. Arrows A1', A2' and A3' of FIGS. 6A, 6B and 6C, respectively, show the rotation of the drive shaft 216, eccentric shaft 218 and the device 104 at a first, second and third time interval, respectively. Arrows B1', B2' and B3' of FIGS. 6A, 6B and 6C, respectively, show the rotation of the drive shaft 216 at the first, second and third time interval, respectively. Because the eccentric shaft 218 is in the open position, the pistons 266 are allowed to reciprocate, and the slippage between the eccentric shaft 218 and the drive shaft 216 is increased. Thus, the eccentric shaft 218 rotates asynchronously with the drive shaft 216.

As depicted in FIGS. 5A-C and 6A-C, eccentric shaft 218 is rotationally driven by the drive shaft 216, but may be selectively adjusted to rotate at variable speeds. As the eccentric shaft 218 is adjusted to the open position (FIGS. 6A-6C), an out of phase motion typically occurs between the drive shaft 216 and the eccentric shaft 218 due to inertia and friction forces. This urges the sliding pistons 266 into a reciprocating motion inside the cylinders 286. The eccentricity between the drive shaft 216 and the eccentric shaft 218 remains constant, and the three pistons 266 are out of phase about the eccentric shaft 218 at 120 degree intervals.

The eccentric shaft 218 may also be adjusted to the closed position to align the motion between the drive shaft 216 and the eccentric shaft 218 as shown in FIGS. 5A-5C. This will force the sliding pistons 266 into a fixed position inside the radial cylinders 286. When insufficient flow is permitted between the cylinders 286, an extremely high resistance like a shock to the fan 104a may be needed to generate an internal pressure inside one of the cylinders 286 sufficient to force the clutch fluid 221 out despite the flow resistance generated by the fluid regulator 267. This configuration may be used to protect the clutch 100 if it is struck by an object.

In some cases, fluid may leak from the central chamber 298 and between the pistons 266 and the cylinders 286, for example when pressure is high or the gap is large. Such leakage can be reduced by increasing the viscosity of the clutch fluid 221. Any fluid loss due to leakage may be replaced by clutch fluid 221 in the reservoir 220. Preferably, as shown in FIGS. 3, 4, 5A-C and 6A-C, three cylinders 286 are positioned at 120 degree angles about the device end 272 of the eccentric shaft 218. While these figures show the cylinders 286 at 120 angles, it will be appreciated that any number of cylinders may be provided, preferably in multiples of three.

Referring again to FIG. 3, the fluid regulator 267 may be used to adjust the eccentric shaft 218 between the open and closed positions to achieve the desired rotation. The adjustment may be determined by selective activation of the fluid regulator 267. This adjustment alters the flow of clutch fluid 221 in the central channel 298. The adjustment of flow may be selectively made to provide for discrete and/or continuous adjustments of the rotation as desired. Such selective adjustment may provide for controllable, restrictable or otherwise desired (discrete and/or continuous) adjustment in pre-defined, specific and/or in an infinite number of positions.

The fluid regulator 267 may be a magnetic or motorized fluid regulator capable of selectively restricting the flow clutch fluid 221 to adjust the rotation of eccentric shaft 218 and device 104. In the magnetic configuration, the first block 268 is a high power permanent magnet, and the second block 270 is an electromagnet. Preferably, the magnets 268, 270 are in the central channel 282 with an opening to the radial channels 292 an equal distance therebetween. The permanent magnet 268 and the electromagnet 270 are configured to achieve opposing poles at adjacent ends thereto such that a magnetic field is generated therebetween when activated.

A magnetic field may be generated by blocks 268, 270 to magnetize the clutch fluid 221. Once magnetized, the clutch fluid 221 may be used to control the flow thereof in the central chamber 298. In such cases, the clutch fluid 221 is preferably a Magneto-Rheological ("MR") fluid, having a carrier fluid with magnetic particles therein, responsive to the magnetic field.

In this aspect of the invention, once current is applied to the magnets 268 and/or 270 a magnetic field is created between opposing poles thereof. This magnetic field may have a controlled intensity that crosses the flow of the clutch fluid 221 in the central chamber 298. Consequently, the magnetic particles inside the clutch fluid 221 may be moved within the carrier fluid and aligned according to the controlling magnetic field. The alignment of the particles in the central chamber 298 is used to restrict the flow of clutch fluid 221 therein. Restricting flow in the central chamber 298 is used to prevent the clutch fluid 221 from flowing between the cylinders 286 and reciprocating pistons 266. The greater the restriction of flow, the less the pistons 266 are able to reciprocate and the less the amount of slippage between the drive shaft 216 and the eccentric shaft 218. As the restriction of flow increases, the speed of eccentric shaft 218 (and fan 104a) becomes more aligned to match the speed of the drive shaft 216. If flow is sufficiently blocked, the pistons 266 will remain stationary and the slippage will be eliminated. Depending on the amount of restriction applied, the movement of the pistons 266, the slippage between the eccentric shaft 218 and the drive shaft 216, and/or the synchronism between the clutch 100 and the motor 102 may be adjusted. Depending on the load requirements, the amount of necessary flow restriction may also vary.

When the magnetic field is reduced, the magnetic particles move to an unaligned position and reduce the restriction on fluid flow between the cylinders 286, thereby permitting the pistons 266 to reciprocate. The misalignment of magnetic particles and release of flow increases the slippage of the rotation of the eccentric shaft 218 thereby altering its speed relative to the drive shaft 216. In this manner, the magnetic particles may be selectively manipulated to alter the flow of clutch fluid 221. Depending on the level of restriction selected, the flow of the clutch fluid 221 may be adjusted accordingly, and the reciprocation of the pistons 266 may be controlled to increase or decrease slippage of the eccentric shaft 218 relative to the drive shaft 216. In this manner, the rotational speed of the eccentric shaft 218 may be adjusted relative to the rotational speed of the drive shaft 216.

When the magnetic field is generated, flow resistance between the three cylinders 286 generates a resistive torque in the eccentric shaft 218. The resistive torque decreases slippage between the drive shaft 216 and the eccentric shaft 218. Preferably, low residual magnetism in the magnetic system is insufficient to restrict flow of the clutch fluid 221 between the three cylinders 286. Thus, absent sufficient power to the fluid regulator 267, a space between the magnets 268, 270 remains open and permits flow of the clutch fluid 221.

In the motorized configuration, the first block 268 of the fluid regulator 267 is a fixed member and the second member 270 is a motor, such as a linear stepper motor. The blocks 268, 270 are positioned in the central channel 282 with an opening to the radial channels 292 therebetween. The motor 270 slidably moves core 284 in the central channel 282 to selectively block the opening to the radial channels 292 and control the flow thereof between the central channel and the radial channels 292. In this manner, the movement of core 284 controls the flow of clutch fluid 221 about the central chamber 298. In such cases, the clutch fluid 221 may be a hydraulic oil, super clean silicone or other motor fluid.

The clutch fluid 221 may be any gas, fluid or other movable substance having a viscosity sufficient to selectively move the pistons 266, such as the carrier fluid with magnetic particles as used in connection with the magnetic configuration, the motor fluid as used in connection with the motorized configuration, or other substance operable in the clutch 100.

The fluid regulator 267 may be provided with internal controllers and/or operatively linked to the controller 112 for selective activation thereof. The controller(s) may also be used to provide current and/or power to the fluid regulator 267. The fluid regulator 267 and/or controller 112 may be used to activate the first block 268 and/or second block 270 to control the flow of clutch fluid 221 therebetween.

Preferably, the fluid regulator 267 and/or controller 112 enable the clutch 100 to operate in a 'smart' mode that allows the clutch 100 to adjust to the needs of the engine 102. The 'smart' mode may involve the monitoring, analysis, evaluation, and/or operation of the clutch 100, for example to balance the power use of the clutch 100 and/or device 104a with operating needs of the engine 102 to optimize operation thereof. The operation of the fluid regulator 267 may be established during an internal decision process and based on input parameters, such as temperature, from, for example, sensor 111. The controller may also enable the clutch 100 to operate in a fail safe mode that limits the amount of flow restriction permitted by the flow regulator 267 to, for example, a maximum and/or a minimum.

The fluid regulator 267 may be powered by the controller 112 and/or by an alternate power source, such as a battery, alternator, etc. The current may be provided to, for example, block 270, to power operation thereof. This current may be used to reduce high flow restriction. Thus, if something fails, such as electrical power, communication, etc., the clutch 100 may continue to operate. Among the advantages provided by the disclosed invention is the real-time control of the engine and/or clutch. It will be appreciated by those skilled in the art that the techniques disclosed herein can be implemented for automated/autonomous applications via software configured with algorithms to perform the desired functions. These aspects can be implemented by programming one or more suitable general-purpose computers having appropriate hardware. The programming may be accomplished through the use of one or more program storage devices readable by the processor(s) and encoding one or more programs of instructions executable by the computer for performing the operations described herein. The program storage device may take the form of, e.g., one or more floppy disks; a CD ROM or other optical disk; a read-only memory chip (ROM); and other forms of the kind well known in the art or subsequently developed. The program of instructions may be "object code," i.e., in binary form that is executable more-or-less directly by the computer; in "source code" that requires compilation or interpretation before execution; or in some intermediate form such as partially compiled code. The precise forms of the program storage device and of the encoding of instructions are immaterial here. Aspects of the invention may also be configured to perform the described functions (via appropriate hardware/software) solely on site and/or remotely controlled via an extended communication (e.g., wireless, internet, satellite, etc.) network.

Figure 7:
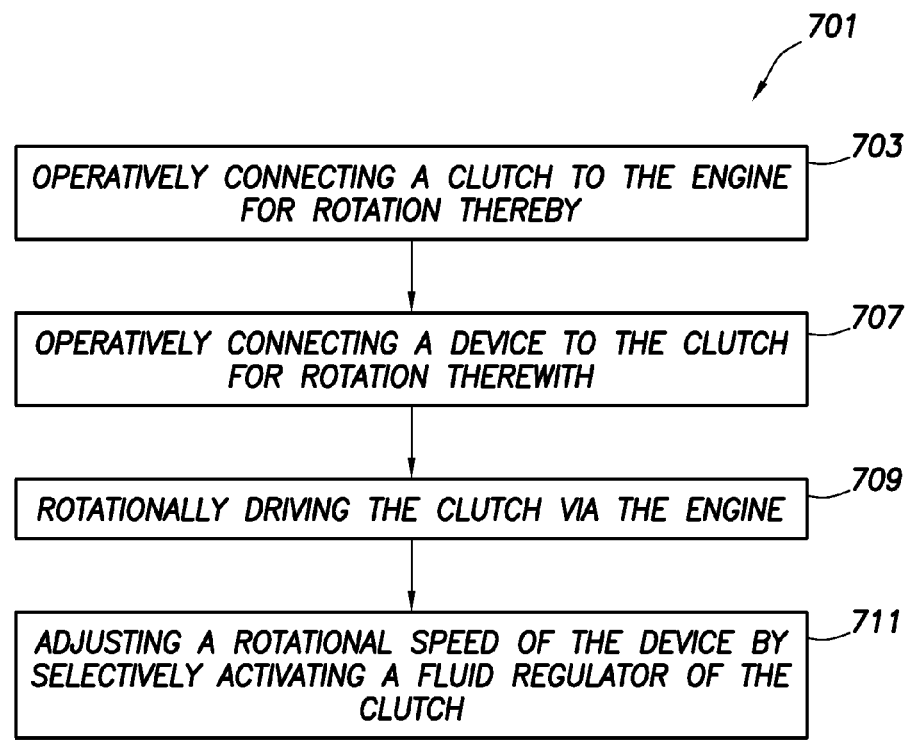
FIG. 7 is a flow diagram of a method of operating a clutch of an engine.

FIG. 7 depicts a method (701) of operating a clutch 100 for an engine, such as the engine 102 as described with respect to, for example, FIGS. 1A-1C. The method involves operatively connecting a clutch 100 to the engine 102 for rotation thereby (703), and operatively connecting a device 104 to the clutch 100 for rotation therewith (707). The clutch 100 may be connected (directly or indirectly) to the engine 102 as described with respect to, for example, FIGS. 1A-1C, and rotationally driven thereby. The clutch 100 has a drive shaft 216 connected to the engine 102 and driven thereby. The clutch also has an eccentric shaft 218 connected to drive shaft 216 and selectively rotated thereby as described with respect to, for example, FIG. 3. The device 104 is connected to the eccentric shaft 218 for rotation therewith as described, for example, with respect to FIGS. 1A-3.

The method further involves rotationally driving the clutch 100 via the engine 102 (709). As described with respect to, for example, FIGS. 1A-3, the drive shaft 216 of clutch 100 is rotated by engine 102. Eccentric shaft 218 is coupled to the drive shaft 216 for selective rotation thereby. Device 104 is connected to the eccentric shaft 218 for rotation therewith. The rotation of the drive shaft 216 by the engine 102 also rotates the eccentric shaft 218 and the device 104.

Finally, the method involves adjusting a rotational speed of the device 104 by selectively activating the fluid regulator 267 (711). As described with respect to, for example, FIGS. 3, 5A-C and 6A-C, the fluid regulator 267 selectively restricts flow of at least a portion of the clutch fluid 211 flowing between the plurality of cylinders 266 and through the central channel 282 such that the plurality of pistons 266 are selectively reciprocated, thereby adjusting rotation of the clutch 100 (and the device 104).

The fluid regulator 267 may generate an electromagnetic field using opposing magnets 268, 270 to align magnetic particles in the clutch fluid 221 therein as described with respect to, for example, FIG. 3. Alternatively, the fluid regulator 267 may position a pair of blocks 268, 270 in the central channel 282 to block motor fluid 221 as described with respect to, for example, FIG. 3.

While the invention has been described with respect to a limited number of embodiments, those skilled in the art, having benefit of this disclosure, will appreciate that other embodiments can be devised which do not depart from the scope of the invention as disclosed herein. For example, one or more clutches 100 and/or device(s) 104 may be used in connection with one or more engines 102. It will also be appreciated by those skilled in the art that conventional electronic and mechanical components may be used to implement aspects of the invention. Accordingly, the scope of the invention should be limited only by the attached claims. The term "comprising" within the claims is intended to mean "including at least" such that the recited listing of elements in a claim are an open group. "A," "an" and other singular terms are intended to include the plural forms thereof unless specifically excluded.

What is claimed is:

1. A clutch for an engine, comprising:
   a drive shaft operatively connectable to the engine for rotation thereby, the drive shaft having an opening extending therethrough;
   a device shaft positionable in the opening of the drive shaft and rotatable thereby, the device shaft having a plurality of cylinders extending radially therethrough and a channel extending longitudinally therethrough with fluid communication therebetween, the device shaft connectable to a device for rotation therewith;
   a clutch fluid selectively flowing between the plurality of cylinders and the channel, the clutch fluid comprising a carrier fluid with a plurality of magnetic particles therein;
   a plurality of pistons, each of the plurality of pistons positionable in one of the plurality of cylinders and slidably movable therein for operative contact with the drive shaft;
   a bearing between the plurality of pistons and the drive shaft; and
   a fluid regulator comprising a pair of opposing magnets positionable in the channel for aligning at least a portion of the plurality of magnetic particles in the channel to selectively restrict flow of at least a portion of the clutch fluid such that the plurality of pistons are selectively reciprocated whereby a rotational speed of the device shaft is adjusted.

2. The clutch of claim 1, wherein the drive shaft is directly connectable to the engine.

3. The clutch of claim 1, wherein the drive shaft is indirectly connectable to the engine.

4. The clutch of claim 1, wherein the drive shaft is operatively connectable to the engine and driven thereby via a power transmission mechanism.

5. The clutch of claim 1, wherein the drive shaft is operatively connectable to the engine and driven thereby via a motor.

6. The clutch of claim 1, further comprising a reservoir operatively connectable to the clutch for providing the clutch fluid thereto.

7. The clutch of claim 6, further comprising a valve for selectively releasing the clutch fluid from the reservoir.

8. The clutch of claim 1, further comprising a controller for operating the fluid regulator.

9. The clutch of claim 1, further comprising at least one sensor for measuring parameters of at least one of the clutch, the engine, the device and combinations thereof.

10. The clutch of claim 1, further comprising a mounting bracket for rotationally mounting the drive shaft to a fixed surface.

11. The clutch of claim 10, further comprising at least one bearing between the mounting bracket and the drive shaft.

12. The clutch of claim 1, further comprising at least one bearing between the drive shaft and the device shaft.

13. The clutch of claim 1, wherein the plurality of cylinders are at 120 degree intervals about the device shaft.

14. The clutch of claim 1, wherein the device is one of a fan, a connector, a coupler, a gear, a pulley and combinations thereof.

15. The clutch of claim 1, wherein the device shaft is an eccentric shaft.

16. The clutch of claim 1, wherein the bearing is a needle bearing.

17. The clutch of claim 1, wherein the pair of opposing magnets comprise a permanent magnet and an electromagnet for generating a field therebetween.

18. The clutch of claim 17, further comprising a core extending through the electromagnet and into the channel.

19. A clutch system for an engine, comprising:
a clutch, comprising:
a drive shaft operatively connectable to the engine for rotation thereby, the drive shaft having an opening extending therethrough;
a device shaft positionable in the opening of the drive shaft and rotatable thereby, the device shaft having a plurality of cylinders extending radially therethrough and a channel extending longitudinally therethrough, with fluid communication therebetween, the device shaft connectable to a device for rotation therewith;
a clutch fluid selectively flowing between the plurality of cylinders and the channel, the clutch fluid comprising a carrier fluid with a plurality of magnetic particles therein;
a plurality of pistons, each of the plurality of pistons positionable in one of the plurality of cylinders and slidably movable therein for operative contact with the drive shaft;
a bearing between the plurality of pistons and the drive shaft and
a fluid regulator comprising a pair of opposing magnets positionable in the channel for aligning at least a portion of the plurality of magnetic particles in the channel to selectively restrict flow of at least a portion of the clutch fluid such that the plurality of pistons are selectively reciprocated whereby a rotational speed of the device shaft is adjusted; and
a device operatively connectable to the clutch for rotation therewith.

20. The system of claim 19, wherein the drive shaft is directly connectable to the engine.

21. The system of claim 19, wherein the drive shaft is indirectly connectable to the engine.

22. The system of claim 19, wherein the drive shaft is operatively connectable to the engine and driven thereby via a power transmission mechanism.

23. The system of claim 19, wherein the drive shaft is operatively connectable to the engine and driven thereby via a motor.

24. The system of claim 19, further comprising a reservoir operatively connectable to the clutch for providing the clutch fluid thereto.

25. The system of claim 24, further comprising a valve for selectively releasing the clutch fluid from the reservoir.

26. The system of claim 19, further comprising a controller for operating the fluid regulator.

27. The system of claim 19, further comprising a sensor for measuring parameters of one of the clutch, the device, the engine and combinations thereof.

28. The system of claim 19, further comprising a mounting bracket for rotationally mounting the drive shaft to a fixed surface.

29. The system of claim 28, further comprising at least one bearing between the mounting bracket and the drive shaft.

30. The system of claim 19, further comprising at least one bearing between the drive shaft and the device shaft.

31. The system of claim 19, wherein the plurality of cylinders are at 120 degree intervals about the device shaft.

32. The clutch of claim 19, wherein the device is one of a fan, a connector, a coupler, a gear, a pulley and combinations thereof.

33. A method of operating a clutch of an engine, comprising:
operatively connecting the clutch to the engine for selective rotation thereby, the clutch comprising:
a drive shaft operatively connectable to the engine for rotation thereby, the drive shaft having an opening extending therethrough;
a device shaft positionable in the opening of the drive shaft and rotatable thereby, the device shaft having a plurality of cylinders extending radially therethrough and a channel extending longitudinally therethrough with fluid communication therebetween, the device shaft connectable to a device for rotation therewith;
a clutch fluid selectively flowing between the plurality of cylinders and the channel, the clutch fluid comprising a carrier fluid with a plurality of magnetic particles therein;
a plurality of pistons, each of the plurality of pistons positionable in one of the plurality of cylinders and slidably movable therein for operative contact with the drive shaft;
a bearing between the plurality of pistons and the drive shaft; and
a fluid regulator comprising a pair of opposing magnets positionable in the channel for aligning at least a portion of the plurality of magnetic particles in the channel to selectively restrict flow of at least a portion of the clutch fluid such that the plurality of pistons are selectively reciprocated whereby a rotational speed of the device shaft is adjusted;
operatively connecting a device to the clutch for rotation therewith; rotationally driving the clutch via the engine; and
adjusting a rotational speed of the device by generating a magnetic field between the pair of opposing magnets to align at least a portion of the plurality of magnetic particles in the channel such that flow of at least a portion of the clutch fluid is selectively restricted and the plurality of pistons are selectively reciprocated.

34. The method of claim 33, wherein the rotationally driving comprises rotationally driving the drive shaft directly via the engine.

35. The method of claim 33, wherein the rotationally driving comprises rotationally driving the drive shaft indirectly via the engine.

36. The method of claim 33, wherein the fluid regulator is operable between a minimum and maximum fluid flow.

37. The method of claim 33, wherein the adjusting comprises adjusting the rotational speed of the device by selectively activating the fluid regulator based on at least one measured parameter.

38. The method of claim 33, wherein the device is one of a fan, a connector, a coupler, a gear, a pulley and combinations thereof.

* * * * *